(12) United States Patent
Hua et al.

(10) Patent No.: US 12,386,688 B2
(45) Date of Patent: Aug. 12, 2025

(54) HIERARCHICAL PARITY PROTECTION GROUPS FOR EFFICIENT DATA RECOVERY

(71) Applicant: Dell Products L.P., Round Rock, TX (US)

(72) Inventors: Kuolin Hua, Natick, MA (US); Michael Scharland, Franklin, MA (US); Jiahui Wang, Framingham, MA (US); Peng Yin, Southborough, MA (US); Sean Hu, Westborough, MA (US); Daohong Wang, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 9 days.

(21) Appl. No.: 18/416,059

(22) Filed: Jan. 18, 2024

(65) Prior Publication Data
US 2025/0238296 A1    Jul. 24, 2025

(51) Int. Cl.
G06F 11/00    (2006.01)
G06F 11/07    (2006.01)
G06F 11/10    (2006.01)

(52) U.S. Cl.
CPC ........ G06F 11/073 (2013.01); G06F 11/1008 (2013.01)

(58) Field of Classification Search
CPC .......................... G06F 11/073; G06F 11/1008
USPC ....................................................... 714/1–57
See application file for complete search history.

(56) References Cited

U.S. PATENT DOCUMENTS

| | | | | |
|---|---|---|---|---|
| 2015/0199237 A1* | 7/2015 | Yochai | ................ | G06F 11/1088 714/6.24 |
| 2015/0324258 A1* | 11/2015 | Browne | ................ | G06F 3/0683 714/6.3 |
| 2020/0293201 A1* | 9/2020 | Chien | ................... | G06F 3/0604 |
| 2023/0005563 A1* | 1/2023 | Sforzin | .................. | G11C 29/18 |

* cited by examiner

Primary Examiner — Sarai E Butler
(74) Attorney, Agent, or Firm — Daly, Crowley, Mofford & Durkee, LLP

(57) ABSTRACT

A method comprising: detecting a storage device failure in a storage array, the storage array including a plurality of storage devices, the storage device failure being a failure of one or more of the plurality of storage devices; wherein: the plurality of storage devices are configured to implement a supergroup including a plurality of subgroups; identifying ones of the plurality of subgroups that are affected by the storage device failure; and rebuilding the identified subgroups, wherein: (A) when a count of failed storage device is less than a first threshold, each of the identified subgroups is rebuilt based only on subgroup parity components for the subgroup without the use of supergroup parity components, and (B) when the count of failed storage devices is between the first threshold and the second threshold, each of the identified subgroups is rebuilt based on both subgroup and supergroup parity components.

20 Claims, 7 Drawing Sheets

500

| SUPERGROUP ID | SUBGROUP DEFINITIONS |
|---|---|
| SUPERGROUP ID | SUBGROUP DEFINITIONS |
| SUPERGROUP ID | SUBGROUP DEFINITIONS |

510 labels each row.

| STRIPE DATA (user data+subroup parity components) | STRIPE INDEX = '0' |
|---|---|
| STRIPE DATA (user data+subroup parity components) | STRIPE INDEX = '1' |
| ⋯ | ⋯ |
| STRIPE DATA (user data+subroup parity components) | STRIPE INDEX = 'M' |

532 labels each row.

| SUPERGROUP PARITY COMPONENT | STRIPE INDEX = '0' | SUPEGROUP PARITY COMPONENT INDEX = '0' |
|---|---|---|
| SUPERGROUP PARITY COMPONENT | STRIPE INDEX = '1' | SUPEGROUP PARITY COMPONENT INDEX = '1' |
| ⋯ | ⋯ | ⋯ |
| SUPRGROUP PARITY COMPONENT | STRIPE INDEX = 'M' | SUPEGROUP PARITY COMPONENT INDEX = 'M' |

552-0, 552-1, ..., 552-M label each row.

FIG. 5C

HIERARCHICAL PARITY PROTECTION GROUPS FOR EFFICIENT DATA RECOVERY

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: detecting a storage device failure in a storage array, the storage array including a plurality of storage devices, the storage device failure being a failure of one or more of the plurality of storage devices; wherein: (i) the plurality of storage devices are configured to implement a supergroup including a plurality of subgroups, each of the plurality of subgroups being formed of a different respective plurality of partitions, each respective plurality of partitions including partitions of different ones of the plurality of storage devices, (ii) each of the plurality of subgroups includes a respective set of stripes, each of the stripes in the respective set including at least a respective subgroup parity component that is calculated based on data that is stored in the stripe, and (iii) the supergroup includes at least a plurality of supergroup parity components, each of the supergroup parity components being calculated based on a different respective plurality of stripes, each respective plurality of stripes including a respective stripe from each of the plurality of subgroups; identifying ones of the plurality of subgroups that are affected by the storage device failure; and rebuilding the identified subgroups, wherein: (A) when a count of failed storage device is less than a first threshold, each of the identified subgroups is rebuilt based only on subgroup parity components for the subgroup without the use of supergroup parity components, and (B) when the count of failed storage devices is between the first threshold and the second threshold, each of the identified subgroups is rebuilt based on both subgroup parity components for the subgroup and at least some of the plurality of supergroup parity components.

According to aspects of the disclosure, a system is provided, comprising: a memory; and at least one processor that is configured to perform the operations of: detecting a storage device failure in a storage array, the storage array including a plurality of storage devices, the storage device failure being a failure of one or more of the plurality of storage devices; wherein: (i) the plurality of storage devices are configured to implement a supergroup including a plurality of subgroups, each of the plurality of subgroups being formed of a different respective plurality of partitions, each respective plurality of partitions including partitions of different ones of the plurality of storage devices, (ii) each of the plurality of subgroups includes a respective set of stripes, each of the stripes in the respective set including at least a respective subgroup parity component that is calculated based on data that is stored in the stripe, and (iii) the supergroup includes at least a plurality of supergroup parity components, each of the supergroup parity components being calculated based on a different respective plurality of stripes, each respective plurality of stripes including a respective stripe from each of the plurality of subgroups; identifying ones of the plurality of subgroups that are affected by the storage device failure; and rebuilding the identified subgroups, wherein: (A) when a count of failed storage device is less than a first threshold, each of the identified subgroups is rebuilt based only on subgroup parity components for the subgroup without the use of supergroup parity components, and (B) when the count of failed storage devices is between the first threshold and the second threshold, each of the identified subgroups is rebuilt based on both subgroup parity components for the subgroup and at least some of the plurality of supergroup parity components.

According to aspects of the disclosure, a non-transitory computer-readable medium storing one or more processor-executable instructions, which, when executed by at least one processor, cause the at least one processor to perform the operations of: detecting a storage device failure in a storage array, the storage array including a plurality of storage devices, the storage device failure being a failure of one or more of the plurality of storage devices; wherein: (i) the plurality of storage devices are configured to implement a supergroup including a plurality of subgroups, each of the plurality of subgroups being formed of a different respective plurality of partitions, each respective plurality of partitions including partitions of different ones of the plurality of storage devices, (ii) each of the plurality of subgroups includes a respective set of stripes, each of the stripes in the respective set including at least a respective subgroup parity component that is calculated based on data that is stored in the stripe, and (iii) the supergroup includes at least a plurality of supergroup parity components, each of the supergroup parity components being calculated based on a different respective plurality of stripes, each respective plurality of stripes including a respective stripe from each of the plurality of subgroups; identifying ones of the plurality of subgroups that are affected by the storage device failure; and rebuilding the identified subgroups, wherein: (A) when a count of failed storage device is less than a first threshold, each of the identified subgroups is rebuilt based only on subgroup parity components for the subgroup without the use of supergroup parity components, and (B) when the count of failed storage devices is between the first threshold and the second threshold, each of the identified subgroups is rebuilt based on both subgroup parity components for the subgroup and at least some of the plurality of supergroup parity components.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 5A is a diagram of an example of a database, according to aspects of the disclosure;

FIG. 5B is a diagram of an example of a subgroup, according to aspects of the disclosure;

FIG. 5C is a diagram of an example of a database, according to aspects of the disclosure;

DETAILED DESCRIPTION

RAID (Redundant Array of Independent Disks) protection groups may be created using whole disks as the data/parity members. In practice, however, the members may be disk segments on separate physical disks. A disk failure will trigger RAID a rebuild using protection group members (data/parity) on remaining good disks. For example, 30.72 TB disks in RAID 6 (24+2) may require 24 disks' worth of data (737 TB) to rebuild all RAID groups affected by the failure. As solid-state disk (SSD) sizes increase exponentially, the data recovery will require correspondingly more data to rebuild the RAID protection groups. This may cause a significant impact on the system workloads, e.g. cache contention and queueing delay. Large protection groups will further aggravate the problem.

According to the present disclosure, a method and system are provided that reduces the workload associated with the rebuilding of storage arrays (such as RAID arrays for example). According to the method and system, protection groups may be organized hierarchically, where a supergroup comprises multiple subgroups. Each subgroup is protected by a single parity against a single failure. The supergroup is equipped with supergroup parity components to protect against dual failures. This hierarchical protection method may use EC (Erasure Coding) or EvenOdd parity to compute the supergroup parity components. It will be understood that the present disclosure is not limited to any protection scheme being used in a supergroup and/or the subgroups that make up the supergroup.

Figure 1:
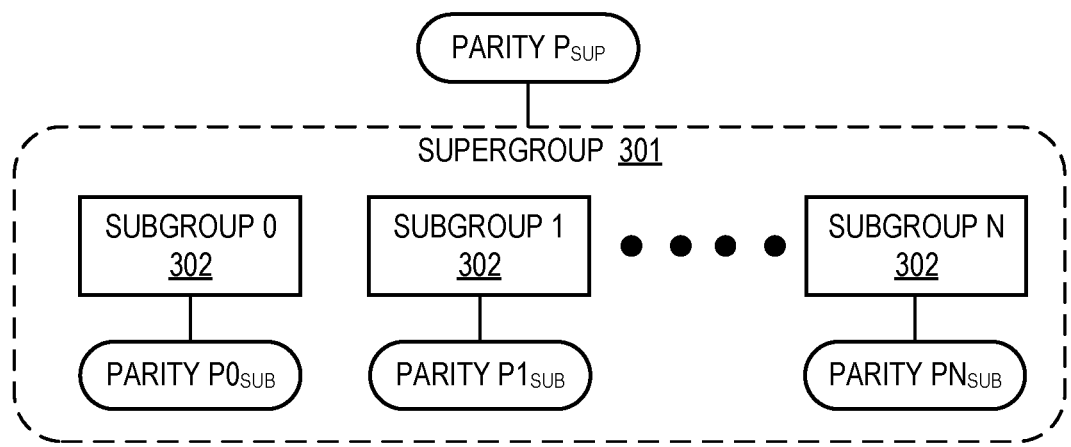
FIG. 1 is a diagram of an example of a storage array supergroup, according to aspects of the disclosure.

FIG. 1 shows an example of a 2-level hierarchy in which a supergroup 301 includes a plurality of subgroups 302. The stripes in each respective subgroup 302 have their own parity components. In addition, for each set of stripes in the supergroup that have the same index, the supergroup may include a supergroup parity component. Under this arrangement, when there is a single storage device failure, data recovery can rebuild any of the subgroups 302 by using only the parity components of the stripes that are part of the subgroup (i.e., without using the supergroup parity components). When multiple storage devices have failed, data recovery can rebuild any of the subgroups by using both the parity components of the stripes in the subgroup as well as the supergroup parity components. Depending on the type of parity components used, the failure of more than two storage devices may also be recoverable.

Figure 2:
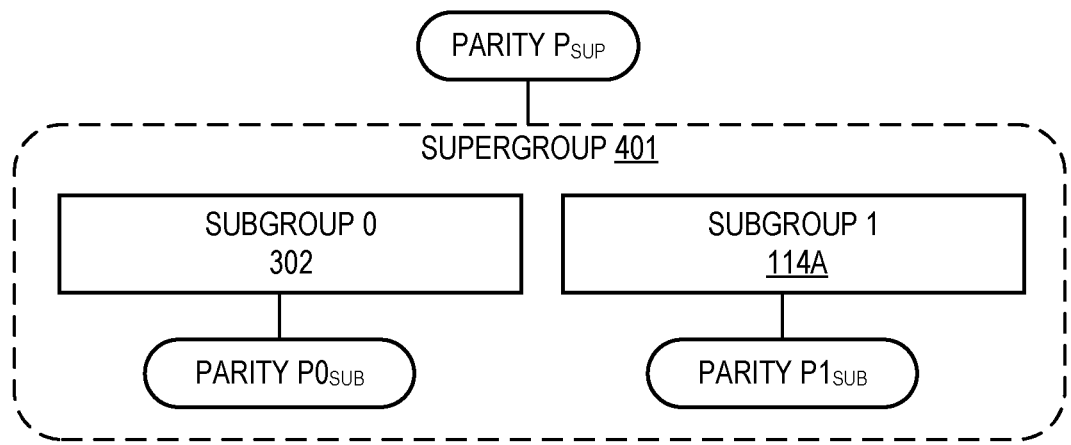
FIG. 2 is a diagram of an example of a storage array supergroup, according to aspects of the disclosure.

An example of a supergroup 401 that includes just two subgroups 302 is provided in FIG. 2. Each of the subgroups 302 includes 8 members (e.g., 8 storage device partitions), for a total of 16 members being part of supergroup 401. The supergroup parity components $P_{SUP}$ may be computed using all 16 data members of the supergroup 401. Subgroup parity components $P0_{SUB}$ may be computed using 8 data members that form one of the subgroups 302 in supergroup 401. Subgroup parity components $P1_{SUB}$ may be computed using 8 data members that form the other one of subgroups 302 that make up supergroup 401. With 16 data members and 3 parity members, the storage efficiency of supergroup 401 will be 16:3 which is comparable to conventional RAID 6 (12+2). Data recovery with RAID 6 (12+2) will require about 12 disks' data regardless of single or dual disk failures. With the hierarchical parity protection that is illustrated in FIG. 2, data recovery from a common single disk failure will require about 8 disks' data, while the rarer dual disk failures (within the same subgroup) will require about 16 disks' data. On average, data recovery with the hierarchical parity protection method requires much less data overhead as compared to RAID 6 (12+2). Furthermore, the probability of dual failures within the same subgroup (8 data members) is much lower than RAID 6 (12+2) with 12 data members per group. For this reason, it is believed that the method and system for that protection is advantageous over data protection methods that are practiced in conventional RAID arrays. Put simply, in single storage device failures, the method and system for data protection may require less data to perform a rebuild that conventional storage arrays.

In the example of FIG. 1, subgroups 302 are enumerated with the numerals 1 through N, where N is a positive integer greater than 2. Each of subgroups 302 may be the same or similar to one of the subgroups 202-210, which are discussed further below with respect to FIG. 2. Subgroup 0 is associated with parity components $P0_{SUB}$, subgroup 2 is associated with parity components $P1_{SUB}$, and subgroup N is associated with parity components $PN_{SUB}$. Parity components $P0_{SUB}$ may include a plurality of parity components, where each parity component is calculated based on user data that is part of a different one of the stripes in subgroup 0, such that no user data from the other subgroups 302 in supergroup 301 is used in calculating the parity component. Parity components $P1_{SUB}$ may include a plurality of parity components, where each parity component is calculated based on user data that is part of a different one of the stripes in subgroup 1, such that no user data from the other subgroups 302 in supergroup 301 is used in calculating the parity component. Parity components $PN_{SUB}$ may include a plurality of parity components, where each parity component is calculated based on user data that is part of a different one of the stripes in subgroup N, such that no user data from the other subgroups 302 in supergroup 301 is used in calculating the parity component. Parity components $P_{SUP}$ includes a plurality of supergroup parity components, where each parity component is calculated based on a different set of stripes, the stripes in each set are part of a different one of subgroups 1-N, and the stripes in each set have the same index. In other words, subgroup parity components (such as $P0_{SUB}$, $P1_{SUB}$, and $PN_{SUB}$) of any particular subgroup 302 may be calculated based only on user data that is stored in this subgroup, to the exclusion of user data that is stored in any other subgroups that are part of the same supergroup as the former subgroup. By contrast, the parity components of a supergroup (such as $P_{SUP}$) may be calculated based on user data that is part of different subgroups. Under the nomenclature of the present disclosure, like numbers refer to like parts, so the subgroups 302 shown in FIG. 2 are the same or similar to the subgroups 302 that are shown in FIG. 1.

As used throughout the disclosure, the term "parity component" shall refer to an erasure code, a parity bit (e.g., XOR parity), and/or any other suitable type of data item that can be used to restore data that was stored in a failed storage device. A non-limiting example of erasure codes includes Reed-Solomon erasure codes.

Figure 3:
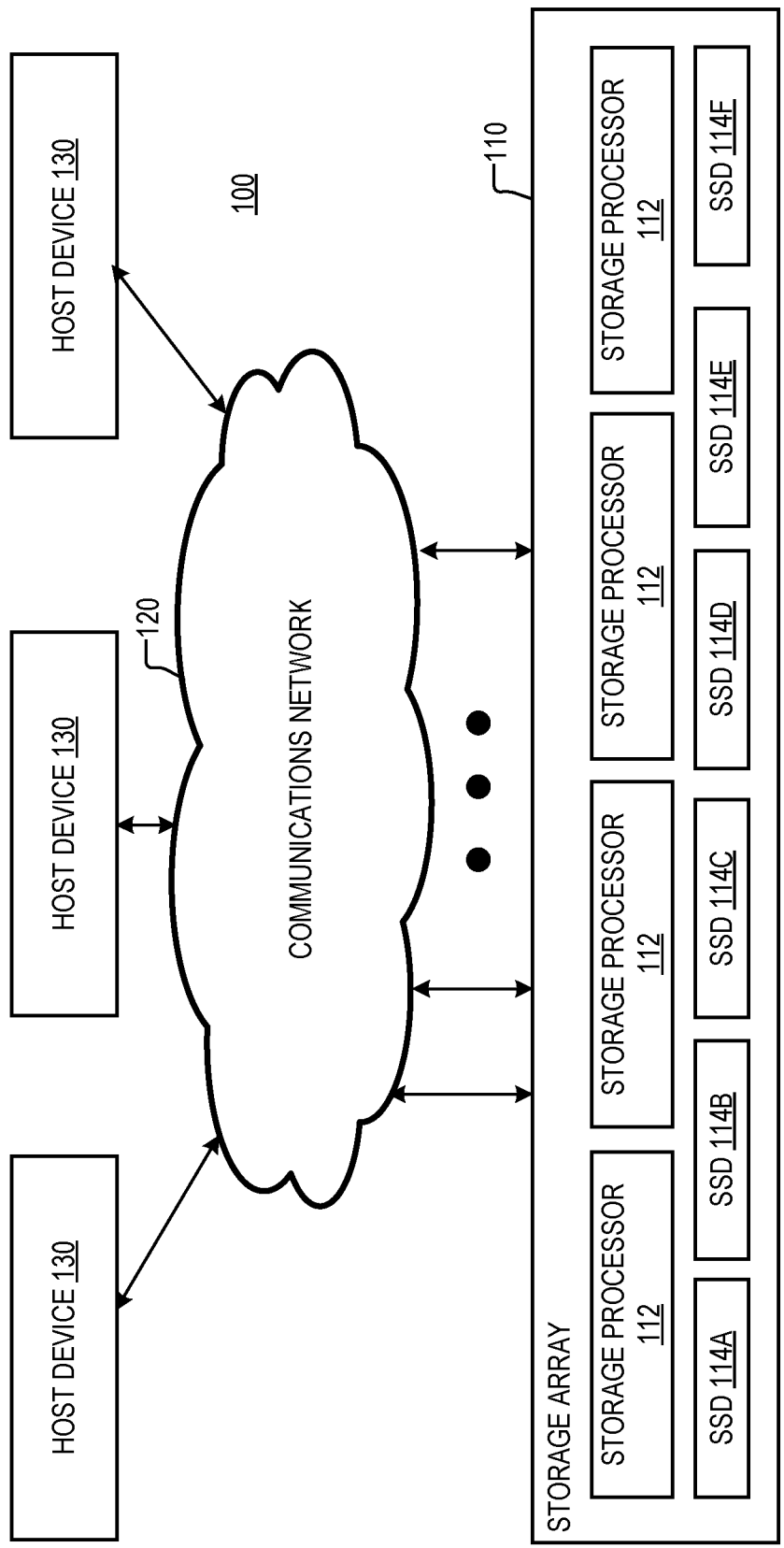
FIG. 3 is a diagram of an example of a system, according to aspects of the disclosure.

FIG. 3 is a diagram of an example of a system 100, according to aspects of the disclosure. As illustrated, system 100 may include a storage array 110, a communications network 120, and a plurality of host devices 130.

Figure 8:
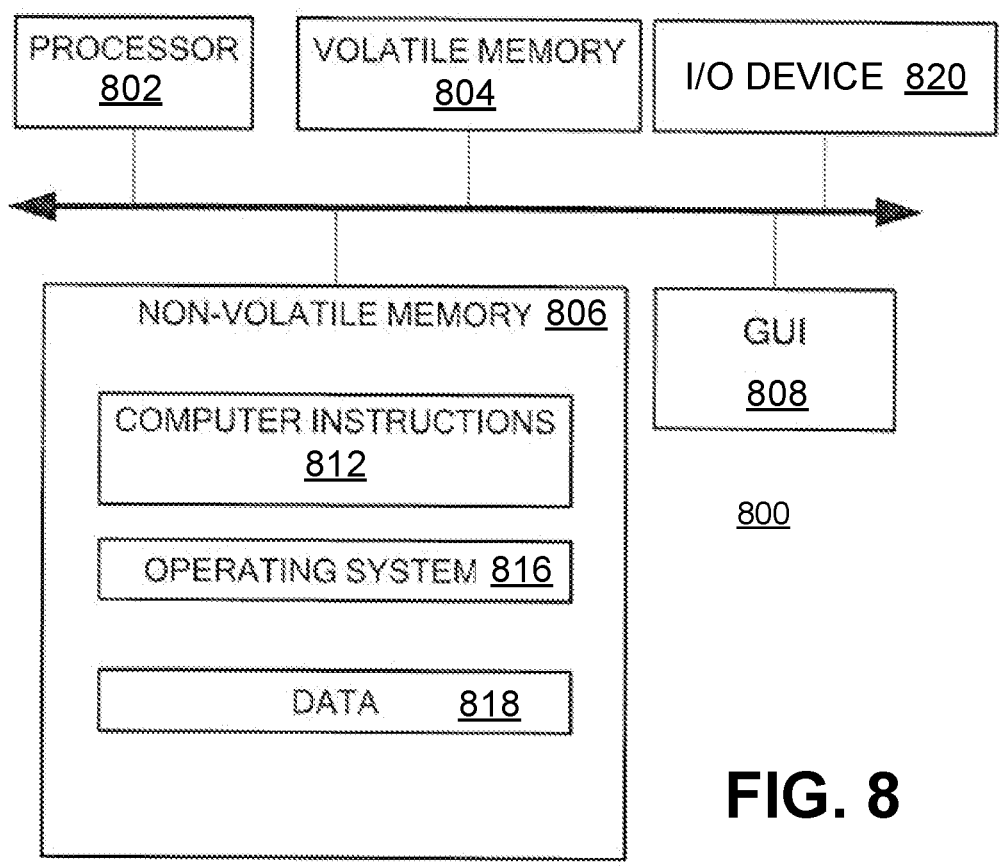
FIG. 8 is a diagram of an example of a computing device, according to aspects of the disclosure.

The storage array 110 may include a plurality of storage processors 112 and a plurality of storage devices 114A-F. Each of the storage processors 112 may include a computing device that is configured to receive I/O requests from any of the host devices 130 and execute the received I/O requests by reading or writing data to the storage devices 114A-F. In some implementations, each of the storage processors 112 may have an architecture that is the same or similar to the architecture of the computing device 800, which is shown in FIG. 8. According to the present example, each of the storage devices 114A-F includes a solid-state drive (SSD). However, alternative implementations are possible in which any of the storage devices 114A-F includes a non-volatile random-access memory (nvRAM) device, a non-volatile memory express (NVME) device, a hard disk (HD), and/or any other suitable type of storage device. The communications network 120 may include one or more of the Internet, a local area network (LAN), a wide area network (WAN), a fibre channel (FC) network, and/or any other suitable type of network. Each of the host devices 130 may include a laptop, a desktop computer, a smartphone, a tablet, an Internet-of-Things device, and/or any other suitable type of electronic device that is configured to retrieve and store data in the storage array 110. In some implementations, each of the host devices 130 may have an architecture that is the same or similar to the architecture of the computing device 800, which is discussed further below with respect to FIG. 8.

Figure 4:
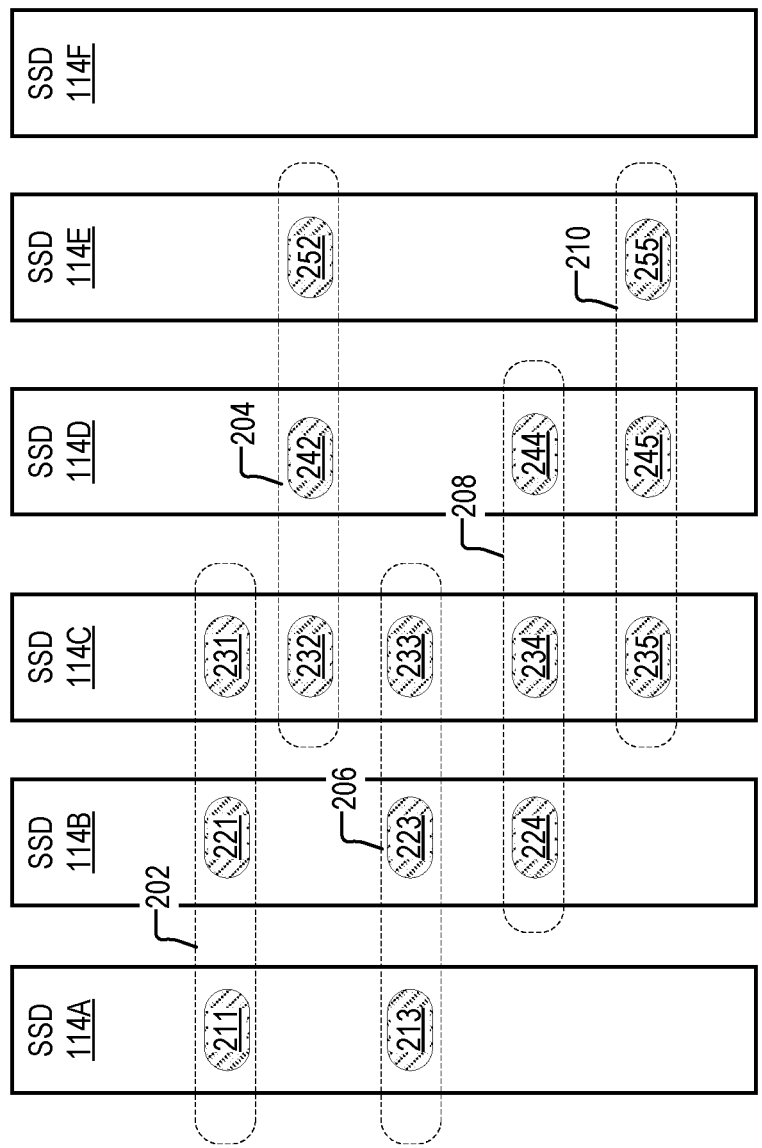
FIG. 4 is a diagram illustrating an example of a set of subgroups that form a supergroup, according to aspects of the disclosure.

FIG. 4 is a diagram illustrating aspects of the operation of storage array 110, according to aspects of the disclosure. According to the example of FIG. 4, storage device 114A is partitioned into at least partitions 211 and 213; storage device 114B is partitioned at least into partitions 221, 223, and 224; storage device 114C is partitioned at least into partitions 231, 232, 233, 234, and 234; storage device 114D is partitioned at least into partitions 242, 244, and 245; and storage device 114E is partitioned at least into partitions 252 and 255. According to the present example, partitions 211, 221, and 231 form a subgroup 202; partitions 232, 242, and 252 form a subgroup 204; partitions 213, 223, and 233 form a subgroup 206; partitions 224, 234, and 244 form a subgroup 208; and partitions 235, 245, and 255 form a subgroup 210. According to the present example, subgroups 202, 204, 206, 208, and 210 are part of the different supergroups. Each of the supergroups may be the same or similar to one of supergroups 301 and 401, which are discussed above with respect to FIGS. 1-2. The supergroup parity components for each supergroup may be stored in a storage device that is different from the storage devices used to implement any of the subgroups that are part of the supergroups. The supergroup parity components for any supergroup may be stored in a different device than the parity components for any other of the remaining supergroups in storage array 110. The supergroup parity components may be the same or similar to the supergroup parity components discussed further below with respect to FIG. 5C. The supergroup parity components may be provided in a database, which is stored in storage device 114F, and which is the same or similar to database 550 (shown in FIG. 5C). In some implementations, storage device 114F may store a supergroup definition for the partition. The supergroup definition may be the same or similar to any of the entries 510, which are discussed further below with respect to FIG. 5A. Although, in the present example, the data members of subgroups 202-210 are partitions that are smaller than the entire capacity of a storage device, alternative implementations are possible in which the data members of subgroups 202-210 are partitions that cover the entire capacities of their respective storage devices.

In some implementations, no storage device overlap may exist between different subgroups in the same supergroup. That is, none of the storage partitions in any of the subgroups in a supergroup may be formed on the same storage device as another partition that is part of a different subgroup in the same supergroup. Similarly, the supergroup parity components (and/or other metadata) for a supergroup may be stored in a different storage device than any of the storage devices used to implement the subgroups in the supergroup. In some implementations, a subgroup may include fewer partitions than there are storage devices in a plurality of storage devices that are used to implement a supergroup of which the subgroup is part.

FIG. 5A is a diagram of an example of a database 500. The database 500 includes a plurality of entries 510. Each entry 510 may include a supergroup identifier and a plurality of subgroup definitions. Each subgroup definition may identify the partitions (or other data members) that make the subgroup. For example, for a subgroup consisting of a plurality of partitions, the subgroup definition may include a different respective descriptor for each of the partitions. The descriptor for any of the partitions may include a first identifier and a second identifier. The first identifier may identify the storage device of which the partition is part. The second identifier may identify the partition among all other partitions on the storage device. The first and second identifiers may or may not be concatenated into the same string. S used herein, the term "database" refers to one or more memory locations (or data structures) that are used to store information. The memory locations may be contiguous or non-contiguous. In one example, each of entries 510 may be stored in one of the storage devices that are used to implement that entry's respective supergroup. Under the nomenclature of the present disclosure, each entry 510 is also referred to as a "supergroup definition". Although not shown, each entry may also include an identifier of (e.g., a pointer to, etc.) a database, such as database 550 (shown in FIG. 5C), which stores the supergroup parity components for the entry's respective supergroup.

FIG. 5B is a diagram of an example of a subgroup 530. According to the present example, subgroup 530 is the same or similar to any of subgroups 302, which are discussed above with respect to FIGS. 1-2. As illustrated, subgroup 530 may include a plurality of stripes 532. Each stripe 532 may be implemented using a respective portion of each of the storage partitions that are used to implement the subgroup. Each stripe 532 may include stripe data and have an assigned stripe index. The stripe data may include user data and one or more parity components. In some implementations, each of the parity components may be stored on a different one of the storage partitions used to implement stripe 532, and different portions of the user data may be stored on different ones of the remaining partitions used to implement stripe 532. In some implementations, each of the parity components of a stripe 532 may be calculated based only on user data that is part of the same stripe 532. Additionally or alternatively, in some implementations, a parity component of a stripe 532 may be calculated based on user data and another parity component of the same stripe 532. In this regard, it will be understood that the present disclosure is not limited to any specific method for calculating or using parity components. Additionally or alternatively, in some implementations, each of stripes 532 may be a RAID stripe (e.g., a RAID 5, 6, or 10 stripe). The stripe index of each stripe 532 may be a number (or another identifier) that identifies that stripe among all stripes 532 in the subgroup 530. For example, the stripe index may be a sequence number and/or any other suitable identifier.

FIG. 5C is a diagram of an example of a database 550 that stores the parity components of a supergroup. The supergroup may be the same or similar to one of supergroups 301 and 401, which are discussed above with respect to FIGS. 1 and 2. Database 550 may include a plurality of entries 552. The entries 552 are indexed with numerals 0 through M, where M is a positive integer greater than 1. The parity component in each entry may be calculated based on a plurality of stripes. Each of the plurality of stripes may be part of a different subgroup of the supergroup. In some implementations, the plurality of stripes may include as many stripes as there are subgroups in the supergroup. In some implementations, each of the plurality of stripes may have the same index within that stripe's subgroup. For example, the supergroup parity component in entry 552-1 may be calculated based only on stripes that have the index of '1' within their respective subgroups. More particularly, in one example, if the supergroup consists of three subgroups, the parity component in entry 552-1 may be calculated based on: (i) data that is part of the stripe having the index of '1' in the first subgroup, (ii) data that is part of the stripe having the index of '1' in the second subgroup, (iii) data that is part of the stripe having the index of '1' in the third subgroup. In this example, no data other than the data enumerated in (i), (ii), and (iii) can be used to calculate the parity component of entry 552-1. In one example, the parity component of entry 552-1 may be calculated based only on user data that is part of the stripes enumerated in (i), (ii), and (iii). In another example, the parity component of entry 552-1 may be calculated based on both user data that is part of the stripes enumerated in (i), (ii), and (iii) as well as subgroup parity components that are part of the same stripes.

In the example of FIG. 5C, entry 552-0 includes a parity component that is calculated based on the stripes bearing the index of '0' in each of the subgroups that make up the supergroup, and it is accorded an index of '0'. Entry 552-1 includes a parity component that is calculated based on the stripes bearing the index of '1' in each of the subgroups that make up the supergroup, and it is accorded an index of '1'. Entry 552-M includes a parity component that is calculated based on the stripes bearing the index of 'M' in each of the subgroups that make up the supergroup, and it is accorded an index of 'M'. Although, in the example of FIG. 5C, a single parity component is provided for each stripe index, alternative implementations are possible in which more than one parity component is provided for each stripe index (which would increase the fault tolerance of the stripes further). FIG. 5C is provided for illustrative purposes only, to show an example of metadata that may be maintained for a supergroup. Those of ordinary skill in the art will readily recognize that at least some of the information may be omitted. For example, the middle column in FIG. 5C may be omitted as its content is implied by the "supergroup parity component" column.

In some implementations, each of subgroups 202-210 may appear as a different RAID protection group to the device. For example, any of subgroups 202-210 may appear as an object that enables the writing and reading of data from the storage device partitions that form the subgroup. Additionally or alternatively, any of subgroups 202-210 may appear as a separate storage device or a separate file system to any of host device 130. In some implementations, an entire supergroup may be presented as a singular file system, a singular device, or a singular data volume.

Figure 6:
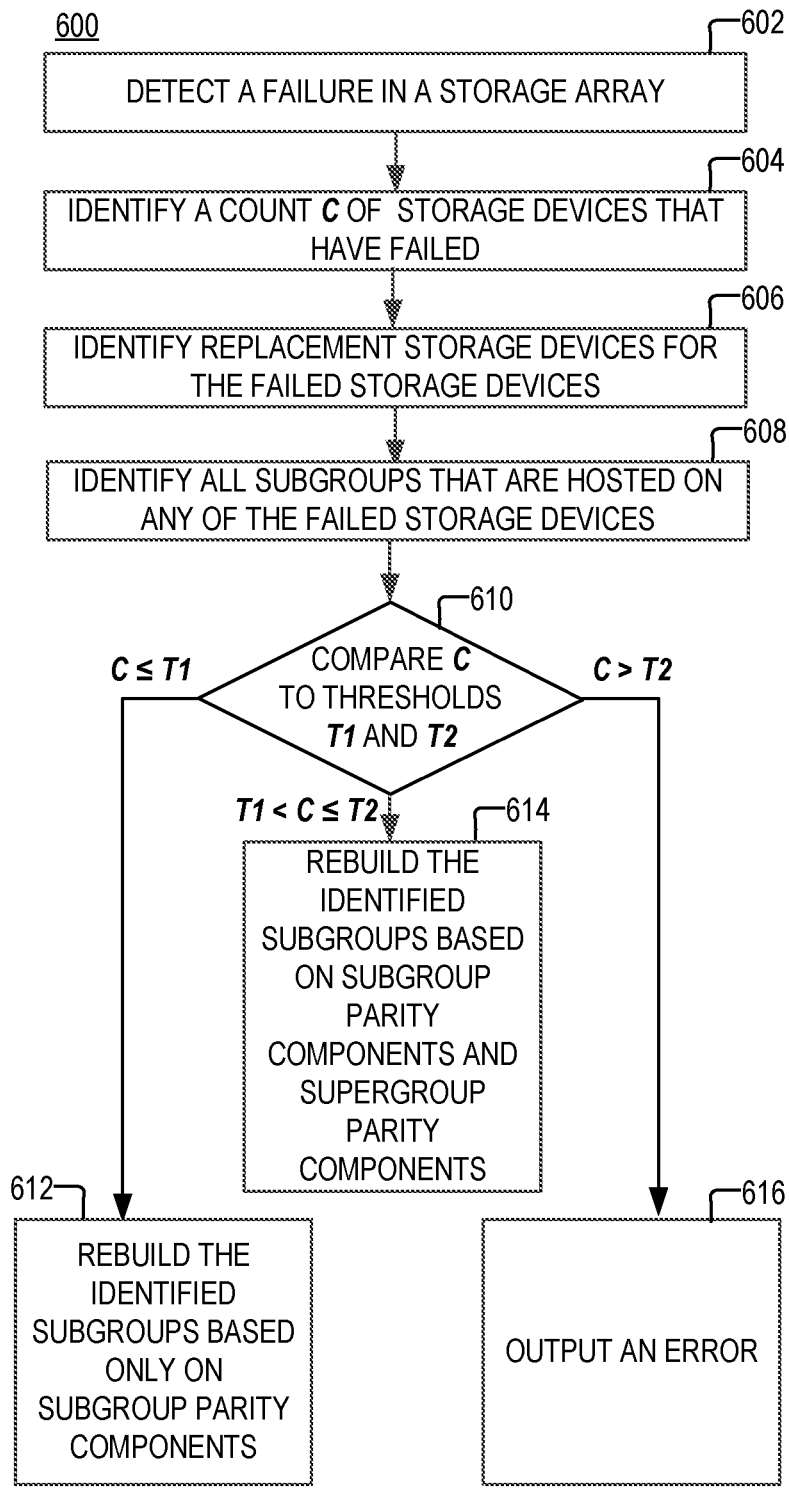
FIG. 6 is a flowchart of an example of a process, according to aspects of the disclosure.

FIG. 6 is a flowchart of an example of a process 600, according to aspects of the disclosure. According to the present example, process 600 is performed by one of storage processors 112. However, the present disclosure is not limited to any specific type of entity performing process 600. For example, in some implementations, process 600 may be performed by the computing device 800, which is discussed further below with respect to FIG. 8. Process 600 is provided as an example. At least some of the steps in process 600 can be performed in a different order, in parallel, or altogether omitted.

At step 602, a failure in a storage array is detected. The detected failure is a failure of one or more storage devices that are part of the storage array. According to the present example, the storage array is storage array 110 and the detected failure is a failure of one or more of storage devices 114A-E.

At step 604, count C of the storage devices that have failed is detected.

At step 606, a respective replacement storage device is identified for each of the failed storage devices. In general, when a storage device fails, the failed device would be physically replaced by a technician or there would be another device waiting on standby to take over the functions of the failed storage device. In this regard, identifying the respective replacement storage device for a failed device may include identifying another storage device that is put in the place of the failed storage device by a technician or identifying another device that would take over the functions of the failed storage device. The replacement storage devices may be identified in response to user input and/or in any other suitable manner. In some implementations, one or more replacement storage devices may be devices that are currently present in the storage array, which are used to implement subgroups in another supergroup, and which have a spare partition that is available to host a rebuilt partition from one of the failed storage devices.

At step 608, the respective subgroups that are hosted on each of the failed storage devices are identified. A subgroup is hosted by a storage device if at least one of the partitions that make up the subgroup is part of the failed storage device. Considering the example of FIG. 4, if storage device 114B fails, subgroups 202, 206, and 208 would be identified as subgroups that are hosted on failed storage device 114B.

At step 610, the value of C (determined at step 604) is compared to thresholds T1 and T2. If the value of C is less than T1, process 600 proceeds to step 612. If the value of C is greater than threshold T1 and less than or equal to threshold T2, process 600 proceeds to step 614. If the value of C is greater than threshold T2, process 600 proceeds to step 616.

At step 612, each of the identified subgroups is rebuilt based only on subgroup parity data. In some implementations, each of the identified subgroups may be the same or similar to one of a RAID 5, RAID 6, or RAID 10 protection group. In this regard, such implementations, each of the subgroups may be rebuilt in the same manner as one would rebuild a RAID 5, RAID 6, or RAID 10 protection group. In general, rebuilding a subgroup may include rebuilding all stripes that are part of the subgroup (or at least rebuilding those stripes whose data cannot be retrieved from the failed storage device(s)). Rebuilding a stripe (at step 612) based only on subgroup parity component(s) may include retrieving all stripe data that is stored in storage devices that have not failed, retrieving the subgroup parity component for the stripe, and using the retrieved data to recalculate the portion of the stripe that is lost due to the device failure(s). It will be recalled that, in some implementations, the stripe data may include both user data and one or more parity components.

At step 614, each of the identified subgroups is rebuilt based on subgroup parity components and supergroup parity components. As noted above, rebuilding a subgroup may include rebuilding all stripes that are part of the subgroup (or at least rebuilding those stripes whose data cannot be retrieved from the failed storage device(s)). Rebuilding a stripe based on both subgroup and supergroup parity components may include (a) retrieving all of the stripe's user data that is stored in storage devices that have not failed, (b) retrieving one or more subgroup parity components that are associated with the stripe (i.e., components that are calculated based on at least a portion of the stripe's stripe or user data), (c) retrieving (e.g., from a database 550) one or more supergroup parity components that have the same index as the stripe, (d) retrieving data from other subgroups that is used to calculate the retrieved supergroup parity components, and I recalculating the stripe based on the data retrieved at (a), (b), (c), and (d). Step 614 differs from step 612 in that step 612 may be executed based only on the data retrieved at (a) and (b), without using the data retrieved at (c) and (d). Because it uses less data, step 612 can be performed using less CPU time and thus it results in less system overhead than step 614.

At step 616, the device executing process 600 outputs an error. In some implementations, outputting the error may include one or more of displaying the error on a display screen, transmitting the error over a communications network to a remote device, and/or saving the error in an error log.

According to the present example, the threshold T1 corresponds to the fault tolerance of the parity component(s) that are part of subgroups (identified at step 608). If one parity component is present in each of the stripes of a subgroup, in most cases, this means that the subgroup can be rebuilt based only on the stripe's parity components when a single storage device failure occurs. If more than one storage device fails, the single parity component would not be sufficient to restore the stripe. In this regard, when only one parity component is present in each of the stripes of a subgroup, the threshold T1 may be equal to '1'. However, if two parity components are present in each stripe, the threshold could equal '2', as the parity components would be capable of restoring data that used to be stored on two different failed storage devices.

According to the present example, the threshold T2 corresponds to the fault tolerance of the parity component(s) of the supergroup of which the subgroups (identified at step 608) are part. If one supergroup parity component is present for each stripe index of the supergroup, and this supergroup parity component is supplemented by a subgroup parity component for the stripe, this means that the subgroup can be rebuilt based on both the subgroup's local parity components and the supergroup's parity components when two of the storage devices that host the subgroup have failed. However, when more than two storage devices have failed, this may not be sufficient to rebuild the stripe. In this regard, when only one subgroup parity component and one supergroup parity component are present for each stripe, the threshold T2 may be equal to '2'. However, if two parity components are present in each stripe, the threshold could equal '2', as the parity components would be capable of restoring data that used to be stored on two different failed storage devices.

Under the nomenclature of the present disclosure, each of the subgroups 302 is a level-1 subgroup. A level-1 subgroup is a data protection group that does not include other subgroups. For example, it could be a data protection group formed of storage device partitions. Under the nomenclature of the present disclosure, supergroups 301 and 401 are level-2 groups. Similarly, a supergroup that includes level-2 groups would be a level-3 group. In other words, a level-2 or higher group would include supergroups as its constituent elements. Accordingly, it is noted that the ideas presented throughout the disclosure can be used to establish hierarchical parity protection that includes more than two levels.

The same principles of data recovery which are described above with respect to FIGS. 1 and 6 may be applied to supergroups that are higher than level 2. In other words, when the count of storage devices is less than the maximum permitted by the parity components that are local to a subgroup (i.e., the subgroup parity components for the subgroup), only the parity components of the subgroup can be used to rebuild the data stored in the subgroup. On the other hand, when more storage devices have failed than what is supported by the subgroup parity components, supergroup parity components for the subgroups would also need to be used to rebuild the subgroup. The supergroup parity components for the subgroup may be the parity components of the next-level group that encapsulates the subgroup. If the subgroup is a level-1 group, the next level supergroup would be a level-2 group, if the subgroup is a level-2 group, the next level supergroup would be a level-3 group, and so forth. On the other hand the term "same-level supergroups" refers to groups that are at the same level. For example, two level-1 groups are same-level groups. Similarly, two level-2 groups are also same-level groups. However, a level-1 group and a level-2 group are not same-level groups; similarly, a level-3 group and a level-2 group are not same-level groups either.

As used herein the term "subgroup parity components for a given subgroup" refers to parity components that are calculated based only on data (e.g., user data) that is stored in the partitions that form the given subgroup. A subgroup parity component would not be calculated based on user data that is stored in partitions that form same-level subgroups other than the given subgroup. By contrast, the term "supergroup parity components for the given subgroup" may include data (e.g., user data and/or parity components) from other same-level subgroups that are part of the given subgroup. According to the example of FIG. 5C, the supergroup, whose parity data is stored in database 550, is a level-2 group. However, the parity components for higher-level groups can be calculated in the same manner as described-namely, each parity component may be calculated based on stripes bearing the same index and optionally lower-level parity components that are calculated on respective proper subsets of those stripes.

When a subgroup is higher than a level-1 group, rebuilding a stripe that is part of the subgroup may include (i)

identifying one or more parity components that are associated with the stripe, (ii) retrieving all retrievable data that is used to calculate the parity components, and recalculating the stripe based on the retrieved data. It will be readily apparent to those of ordinary skill in the art, after reading the present disclosure, how to recover data that is lost as a result of device failure based on one or more parity components for the data as well as other data used to calculate the parity components, which is stored on devices that are still functional.

As noted above, the use of hierarchical data protection helps reduce the system overhead that is associated with data recovery. In general, large SSDs and protection groups cause data recovery challenges, as storage drives can reach 30 TB in RAID 6. Data recovery is more efficient with smaller protection groups. Furthermore, most data recovery instances involve a single disk failure, while multiple disk failures are considerably rarer. In this regard, dividing a supergroup into subgroups that contain local parity components which provide tolerance to single-device failure is advantageous because it could result in faster recovery times (and lower system overhead), then when the subgroup is not subdivided.

Consider an example, in which a supergroup includes 16 data partitions and 3 parity partitions. The supergroup may include two subgroups. In this example, the data partitions store user data, one of the parity partitions stores subgroup parity components that correspond to only one of the subgroups, another one of the parity partitions stores parity components that correspond to the other one of the subgroups, and the third parity partition stores the supergroup parity components for the supergroup. In this example, the fault tolerance of the supergroup is comparable to that of a RAID 6 (12+2) group. However, the overhead experienced as a result of a single-device failure recovery would be comparable to that of a RAID 6 (8+2)—in other words, the rebuild of the supergroup (or affected subgroups) would be faster and less resource intensive than the rebuild of a RAID 6 (12+2) group when a single device fails. Dual failures within the same subgroup are rare. The probability is proportional to the square of the group size. In the example supergroup, the probability is proportional $8^2=64$, whereas in a RAID 6 (12+2) group, the probability is proportional $12^2=144$. In other words, the architecture described throughout the present disclosure has the added benefit of having a lower probability or requiring a dual failure recovery than a comparable RAID 6 (12+2) group.

Moreover, if the number of supergroup parity components is increased to provide tolerance against triple storage device failure, the probability of a triple storage device failure in the same subgroup would be proportional to $8^3=512$, whereas the probability of a triple storage device failure in a RAID 6 (12+3) group would be proportional to $12^3=1728$. In other words, the architecture described throughout the present disclosure has the added benefit of having a lower probability or requiring a ripple failure recovery than a comparable RAID 6 (12+3) group.

Figure 7:
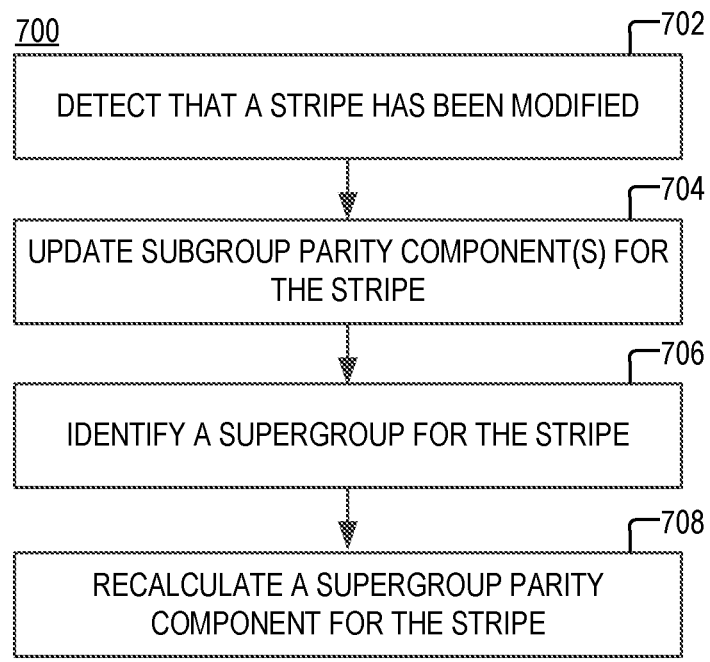
FIG. 7 is a flowchart of an example of a process, according to aspects of the disclosure.

FIG. 7 is a flowchart of an example of a process 700, according to aspects of the disclosure. According to the present example, process 700 is performed by one of storage processors 112 (hereinafter "the given storage processor 112"). However, the present disclosure is not limited to any specific type of entity performing process 700. At least some of the steps in process 700 can be performed in a different order, in parallel, or altogether omitted. At step 702, the given storage processor 112 detects that the user data that is stored in a stripe has been modified. At step 704, the given storage processor updates one or more parity components that are part of the stripe data of the stripe. At step 706, the given storage process Ir identifies a at least one supergroup of which the stripe is part (i.e., a supergroup containing the subgroup of which the stripe is part). At step 708, the given storage processor 12 recalculates one or more supergroup parity components that have the same index as the stripe (or which is otherwise associated with the stripe), and which are associated with the identified supergroups.

Referring to FIG. 8, in some embodiments, a computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804. Program code may be applied to data entered using an input device of GUI 808 or received from I/O device 820.

FIGS. 1-8 are provided as an example only. In some embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
   detecting a storage device failure in a storage array, the storage array including a plurality of storage devices, the storage device failure being a failure of one or more of the plurality of storage devices; wherein: (i) the plurality of storage devices are configured to implement a supergroup including a plurality of subgroups, each of the plurality of subgroups being formed of a different respective plurality of partitions, each respective plurality of partitions including partitions of different ones of the plurality of storage devices, (ii) each of the plurality of subgroups includes a respective set of stripes, each of the stripes in the respective set including at least a respective subgroup parity component that is calculated based on data that is stored in the stripe, and (iii) the supergroup includes at least a plurality of supergroup parity components, each of the supergroup parity components being calculated based on a different respective plurality of stripes, each respective plurality of stripes including a respective stripe from each of the plurality of subgroups;
   identifying ones of the plurality of subgroups that are affected by the storage device failure; and
   rebuilding the identified subgroups, wherein: (A) when a count of failed storage device is less than a first threshold, each of the identified subgroups is rebuilt based only on subgroup parity components for the subgroup without the use of supergroup parity components, and (B) when the count of failed storage devices is between the first threshold and the second threshold, each of the identified subgroups is rebuilt based on both subgroup parity components for the subgroup and at least some of the plurality of supergroup parity components.

2. The method of claim 1, wherein only the identified subgroups are rebuilt in response to the storage device failure.

3. The method of claim 1, wherein the plurality of storage devices are configured to store a data structure that maps an identifier of the supergroup to a plurality of identifiers that correspond to the plurality of subgroups in the supergroup.

4. The method of claim 1, wherein no storage device overlap is present between any of the subgroups in the plurality of subgroups.

5. The method of claim 1, wherein each of the supergroup parity components includes one of a parity bit or an erasure code.

6. The method of claim 1, wherein:
   rebuilding the identified subgroups includes rebuilding any of the plurality of stripes in any of the identified subgroups, and
   any of the plurality of stripes in any of the identified subgroups is rebuilt by: (a) when the count of failed storage devices is less than the first threshold, restoring the stripe based on the subgroup parity component that is part of the stripe without using any supergroup parity components, and (b) when the count of failed storage devices is between the first threshold and the second threshold, restoring the stripe based on both the subgroup parity component that is part of the stripe and a supergroup parity component for the stripe.

7. The method of claim 1, further comprising generating an error when the count of failed storage devices is greater than the second threshold.

8. A system, comprising:
a memory; and
at least one processor that is configured to perform the operations of:
detecting a storage device failure in a storage array, the storage array including a plurality of storage devices, the storage device failure being a failure of one or more of the plurality of storage devices; wherein: (i) the plurality of storage devices are configured to implement a supergroup including a plurality of subgroups, each of the plurality of subgroups being formed of a different respective plurality of partitions, each respective plurality of partitions including partitions of different ones of the plurality of storage devices, (ii) each of the plurality of subgroups includes a respective set of stripes, each of the stripes in the respective set including at least a respective subgroup parity component that is calculated based on data that is stored in the stripe, and (iii) the supergroup includes at least a plurality of supergroup parity components, each of the supergroup parity components being calculated based on a different respective plurality of stripes, each respective plurality of stripes including a respective stripe from each of the plurality of subgroups;
identifying ones of the plurality of subgroups that are affected by the storage device failure; and
rebuilding the identified subgroups, wherein: (A) when a count of failed storage device is less than a first threshold, each of the identified subgroups is rebuilt based only on subgroup parity components for the subgroup without the use of supergroup parity components, and (B) when the count of failed storage devices is between the first threshold and the second threshold, each of the identified subgroups is rebuilt based on both subgroup parity components for the subgroup and at least some of the plurality of supergroup parity components.

9. The system of claim 8, wherein only the identified subgroups are rebuilt in response to the storage device failure.

10. The system of claim 8, wherein the plurality of storage devices are configured to store a data structure that maps an identifier of the supergroup to a plurality of identifiers that correspond to the plurality of subgroups in the supergroup.

11. The system of claim 8, wherein no storage device overlap is present between any of the subgroups in the plurality of subgroups.

12. The system of claim 8, wherein each of the supergroup parity components includes one of a parity bit or an erasure code.

13. The system of claim 8, wherein:
rebuilding the identified subgroups includes rebuilding any of the plurality of stripes in any of the identified subgroups, and
any of the plurality of stripes in any of the identified subgroups is rebuilt by: (a) when the count of failed storage devices is less than the first threshold, restoring the stripe based on the subgroup parity component that is part of the stripe without using any supergroup parity components, and (b) when the count of failed storage devices is between the first threshold and the second threshold, restoring the stripe based on both the subgroup parity component that is part of the stripe and a supergroup parity component for the stripe.

14. The system of claim 8, wherein the at least one processor is further configured to perform the operation of generating an error when the count of failed storage devices is greater than the second threshold.

15. A non-transitory computer-readable medium storing one or more processor-executable instructions, which, when executed by at least one processor, cause the at least one processor to perform the operations of:
detecting a storage device failure in a storage array, the storage array including a plurality of storage devices, the storage device failure being a failure of one or more of the plurality of storage devices; wherein: (i) the plurality of storage devices are configured to implement a supergroup including a plurality of subgroups, each of the plurality of subgroups being formed of a different respective plurality of partitions, each respective plurality of partitions including partitions of different ones of the plurality of storage devices, (ii) each of the plurality of subgroups includes a respective set of stripes, each of the stripes in the respective set including at least a respective subgroup parity component that is calculated based on data that is stored in the stripe, and (iii) the supergroup includes at least a plurality of supergroup parity components, each of the supergroup parity components being calculated based on a different respective plurality of stripes, each respective plurality of stripes including a respective stripe from each of the plurality of subgroups;
identifying ones of the plurality of subgroups that are affected by the storage device failure; and
rebuilding the identified subgroups, wherein: (A) when a count of failed storage device is less than a first threshold, each of the identified subgroups is rebuilt based only on subgroup parity components for the subgroup without the use of supergroup parity components, and (B) when the count of failed storage devices is between the first threshold and the second threshold, each of the identified subgroups is rebuilt based on both subgroup parity components for the subgroup and at least some of the plurality of supergroup parity components.

16. The non-transitory computer-readable medium of claim 15, wherein only the identified subgroups are rebuilt in response to the storage device failure.

17. The non-transitory computer-readable medium of claim 15, wherein the plurality of storage devices are configured to store a data structure that maps an identifier of the supergroup to a plurality of identifiers that correspond to the plurality of subgroups in the supergroup.

18. The non-transitory computer-readable medium of claim 15, wherein no storage device overlap is present between any of the subgroups in the plurality of subgroups.

19. The non-transitory computer-readable medium of claim 15, wherein each of the supergroup parity components includes one of a parity bit or an erasure code.

20. The non-transitory computer-readable medium of claim 15, wherein:
rebuilding the identified subgroups includes rebuilding any of the plurality of stripes in any of the identified subgroups, and any of the plurality of stripes in any of the identified subgroups is rebuilt by: (a) when the count of failed storage devices is less than the first threshold, restoring the stripe based on the subgroup parity component that is part of the stripe without using any supergroup parity components, and (b) when the count of failed storage devices is between the first threshold and the second threshold, restoring the stripe based on both the subgroup parity component that is part of the stripe and a supergroup parity component for the stripe.

* * * * *